US008930834B2

(12) United States Patent
Sunday et al.

(10) Patent No.: US 8,930,834 B2
(45) Date of Patent: Jan. 6, 2015

(54) VARIABLE ORIENTATION USER INTERFACE

(75) Inventors: Derek E. Sunday, Renton, WA (US); Chris Whytock, Seattle, WA (US); Dane Storrusten, Seattle, WA (US); Sabrina Boler, Seattle, WA (US); Nicole Coddington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/378,267

(22) Filed: Mar. 20, 2006

(65) Prior Publication Data

US 2007/0220444 A1    Sep. 20, 2007

(51) Int. Cl.
*G06F 3/00*        (2006.01)
*G06F 3/048*       (2013.01)
*G06F 3/0488*      (2013.01)

(52) U.S. Cl.
CPC .................................... *G06F 3/0488* (2013.01)
USPC ........... 715/764; 715/810; 715/249; 715/786; 715/779; 715/782; 715/781

(58) Field of Classification Search
USPC .......... 715/764, 249, 810, 779, 786, 782, 781
See application file for complete search history.

(56) References Cited

U.S. PATENT DOCUMENTS

| 4,817,176 | A |   | 3/1989  | Marshall et al. ............. 382/280 |
| 5,230,063 | A |   | 7/1993  | Hoeber et al. |
| 5,252,951 | A |   | 10/1993 | Tannenbaum et al. ........ 345/156 |
| 5,345,549 | A |   | 9/1994  | Appel et al. .................. 715/741 |
| 5,423,554 | A |   | 6/1995  | Davis |
| 5,434,964 | A | * | 7/1995  | Moss et al. ..................... 715/788 |
| 5,463,725 | A |   | 10/1995 | Henckel et al. ............... 715/776 |
| 5,665,951 | A |   | 9/1997  | Newman et al. |
| 5,714,698 | A |   | 2/1998  | Tokioka et al. |

(Continued)

FOREIGN PATENT DOCUMENTS

| WO | 0050979    | 8/2001 |
| WO | WO 0236225 | 5/2002 |

(Continued)

OTHER PUBLICATIONS

Noi Sukaviriya et al., "Augmenting a Retail Environment Using Steerable Interactive Displays", 2 pages, http://www.research.ibm.com/ed/publications/chi03b.pdf, date unknown.

(Continued)

*Primary Examiner* — Amy Ng
*Assistant Examiner* — Erik Stitt
(74) *Attorney, Agent, or Firm* — Jeremy Snodgrass; Judy Yee; Micky Minhas

(57) ABSTRACT

A graphical user interface system is described in which users can be located at any angle. Different application interfaces can be generated on the display to appear in different orientations, such that different users sitting at different positions around the periphery of a display surface may each have an interface that is readable and accessible. The location and orientation of a new interface may be specified by user request, or may be automatically determined based on a characteristic of the request, such as the location of a tap or the direction of a swipe gesture. Interfaces may be radial in nature, and may have a central origin on the display, or at corners of the display.

15 Claims, 16 Drawing Sheets

(56) References Cited

U.S. PATENT DOCUMENTS

| | | | |
|---|---|---|---|
| 5,804,803 A | 9/1998 | Cragun et al. | |
| 5,818,450 A * | 10/1998 | Katsuta | 715/840 |
| 5,883,626 A * | 3/1999 | Glaser et al. | 715/788 |
| 5,910,653 A | 6/1999 | Campo | |
| 5,943,164 A | 8/1999 | Rao | |
| 6,159,100 A | 12/2000 | Smith | |
| 6,181,343 B1 | 1/2001 | Lyons | |
| 6,240,207 B1 | 5/2001 | Shinozuka et al. | 382/187 |
| 6,247,128 B1 | 6/2001 | Fisher et al. | |
| 6,333,735 B1 | 12/2001 | Anvekar | |
| 6,414,672 B2 | 7/2002 | Rekimoto et al. | 345/173 |
| 6,445,364 B2 | 9/2002 | Zwern | |
| 6,448,964 B1 * | 9/2002 | Isaacs et al. | 345/419 |
| 6,452,593 B1 | 9/2002 | Challener | |
| 6,512,507 B1 | 1/2003 | Furihata | |
| 6,545,663 B1 | 4/2003 | Arbter et al. | |
| 6,568,596 B1 | 5/2003 | Shaw | |
| 6,577,330 B1 * | 6/2003 | Tsuda et al. | 715/782 |
| 6,593,945 B1 * | 7/2003 | Nason et al. | 715/779 |
| 6,624,833 B1 | 9/2003 | Kumar | |
| 6,630,943 B1 * | 10/2003 | Nason et al. | 715/746 |
| 6,662,365 B1 | 12/2003 | Sullivan et al. | |
| 6,667,741 B1 | 12/2003 | Kataoka et al. | |
| 6,672,961 B1 | 1/2004 | Uzun | |
| 6,686,931 B1 | 2/2004 | Bodnar | 715/741 |
| 6,720,860 B1 | 4/2004 | Narayanaswami | 340/5.54 |
| 6,735,625 B1 | 5/2004 | Ponna | |
| 6,745,234 B1 | 6/2004 | Philyaw et al. | |
| 6,765,559 B2 | 7/2004 | Hayakawa | |
| 6,767,287 B1 | 7/2004 | McQuaid et al. | |
| 6,768,419 B2 | 7/2004 | Karel et al. | |
| 6,791,530 B2 | 9/2004 | Vernier et al. | |
| 6,792,452 B1 | 9/2004 | Philyaw | |
| 6,822,635 B2 | 11/2004 | Shahoian et al. | |
| 6,842,175 B1 | 1/2005 | Schmalstieg et al. | 345/427 |
| 6,847,856 B1 | 1/2005 | Bohannon | |
| 6,910,076 B2 | 6/2005 | Lortz | |
| 6,950,534 B2 | 9/2005 | Cohen et al. | |
| 6,965,842 B2 | 11/2005 | Rekimoto | |
| 6,990,660 B2 | 1/2006 | Moshir et al. | |
| 7,036,090 B1 * | 4/2006 | Nguyen | 715/834 |
| 7,085,590 B2 * | 8/2006 | Kennedy et al. | 455/556.1 |
| 7,098,891 B1 | 8/2006 | Pryor | |
| 7,104,891 B2 | 9/2006 | Osako et al. | |
| 7,148,876 B2 | 12/2006 | Kawasome | |
| 7,259,747 B2 | 8/2007 | Bell | 345/156 |
| 7,327,376 B2 * | 2/2008 | Shen et al. | 345/676 |
| 7,397,464 B1 | 7/2008 | Robbins et al. | 345/173 |
| 7,469,381 B2 * | 12/2008 | Ording | 715/702 |
| 7,483,015 B2 | 1/2009 | Sato | |
| 7,612,786 B2 | 11/2009 | Vale et al. | 345/619 |
| 2001/0012001 A1 | 8/2001 | Rekimoto et al. | 345/173 |
| 2001/0054082 A1 | 12/2001 | Rudolph et al. | |
| 2002/0109737 A1 | 8/2002 | Jaeger | |
| 2002/0151337 A1 | 10/2002 | Yamashita et al. | |
| 2002/0154214 A1 | 10/2002 | Scallie et al. | |
| 2002/0180811 A1 | 12/2002 | Chu | 345/856 |
| 2003/0025676 A1 | 2/2003 | Cappendijk | |
| 2003/0063132 A1 | 4/2003 | Sauer et al. | |
| 2003/0119576 A1 | 6/2003 | McClintock et al. | |
| 2003/0234773 A1 | 12/2003 | Sano et al. | |
| 2004/0005920 A1 | 1/2004 | Soltys et al. | |
| 2004/0032409 A1 | 2/2004 | Girard | |
| 2004/0046784 A1 * | 3/2004 | Shen et al. | 345/733 |
| 2004/0051733 A1 | 3/2004 | Katzie | |
| 2004/0090432 A1 | 5/2004 | Takahashi et al. | |
| 2004/0119746 A1 | 6/2004 | Mizrah | 345/763 |
| 2004/0127272 A1 | 7/2004 | Park et al. | |
| 2004/0141008 A1 * | 7/2004 | Jarczyk et al. | 345/781 |
| 2004/0141648 A1 | 7/2004 | Dodge et al. | |
| 2004/0212617 A1 | 10/2004 | Fitzmaurice | |
| 2004/0246240 A1 | 12/2004 | Kolmykov-Zotov et al. | |
| 2005/0054392 A1 | 3/2005 | Too | |
| 2005/0069186 A1 | 3/2005 | Kobayashi | |
| 2005/0110781 A1 | 5/2005 | Geaghan et al. | |
| 2005/0122308 A1 | 6/2005 | Bell et al. | |
| 2005/0134578 A1 | 6/2005 | Chambers et al. | |
| 2005/0146508 A1 | 7/2005 | Kirkland et al. | |
| 2005/0153128 A1 | 7/2005 | Selinfreund et al. | |
| 2005/0162402 A1 | 7/2005 | Watanachote | |
| 2005/0166264 A1 | 7/2005 | Yamada et al. | |
| 2005/0177054 A1 | 8/2005 | Yi et al. | |
| 2005/0183035 A1 | 8/2005 | Ringel | |
| 2005/0193120 A1 | 9/2005 | Taylor | |
| 2005/0200291 A1 | 9/2005 | Naugler et al. | |
| 2005/0248729 A1 | 11/2005 | Drucker et al. | |
| 2005/0251800 A1 | 11/2005 | Kurlander et al. | |
| 2005/0253872 A1 | 11/2005 | Goss et al. | |
| 2005/0275622 A1 | 12/2005 | Patel et al. | 345/156 |
| 2005/0277071 A1 | 12/2005 | Yee | |
| 2005/0280631 A1 | 12/2005 | Wong et al. | |
| 2006/0015501 A1 | 1/2006 | Sanamrad et al. | 707/9 |
| 2006/0017709 A1 | 1/2006 | Okano | |
| 2006/0026535 A1 | 2/2006 | Hotelling | |
| 2006/0075250 A1 | 4/2006 | Liao | |
| 2006/0077211 A1 * | 4/2006 | Zhou | 345/650 |
| 2006/0090078 A1 | 4/2006 | Blythe et al. | 716/185 |
| 2006/0119541 A1 | 6/2006 | Blythe et al. | 345/31 |
| 2006/0156249 A1 * | 7/2006 | Blythe et al. | 715/781 |
| 2006/0161871 A1 | 7/2006 | Hotelling et al. | |
| 2006/0244719 A1 | 11/2006 | Brigham et al. | |
| 2006/0244734 A1 | 11/2006 | Hill et al. | |
| 2007/0063981 A1 | 3/2007 | Galyean et al. | |
| 2007/0188518 A1 | 8/2007 | Vale et al. | |
| 2007/0236485 A1 | 10/2007 | Trepte | |
| 2007/0284429 A1 | 12/2007 | Beeman | |
| 2007/0300182 A1 | 12/2007 | Bilow | |
| 2007/0300307 A1 | 12/2007 | Duncan | |
| 2008/0040692 A1 | 2/2008 | Sunday et al. | |
| 2008/0192005 A1 | 8/2008 | Elgoyhen et al. | 345/158 |
| 2008/0211813 A1 | 9/2008 | Jamwal et al. | 345/426 |

FOREIGN PATENT DOCUMENTS

| | | |
|---|---|---|
| WO | WO 2005040944 | 5/2005 |
| WO | WO 2005122557 | 12/2005 |
| WO | 2006003586 | 1/2006 |

OTHER PUBLICATIONS

Chia Shen et al., "DiamondSpin: An Extensible Toolkit for Around-the-Table Interaction", 8 pages, http://hci.stanford.edu/publications/2004/diamondspin/diamondspin.pdf, Apr. 2004.

Andrew D. Wilson, "PlayAnywhere: A Compact Interactive Tabletop Projection-Vision System", 10 pages, http://research.microsoft.com/~awilson/papers/Wilson%20PlayAnywhere%20UIST%202005.pdf, Oct. 2005.

Sasaki et al., "Hands-Free User Interface for Seamless Collaborative Works in Shared MR Space", date unknown, 6 pp.

Krishna et al., "23.3: Tactile Sensor Based on Piezoelectric Resonance", 2002 IEEE, pp. 1643-1647.

http://www.softsland.com/Natural_Login_Pro.html, Apr. 13, 2006, 3 pp.

Logitech, "SecureConnect: A Major Leap in the Cordless Desktop Experience", http://www.logitech.com/pub/pdf/bluetooth/secure_connect_whitepaper.pdf, received Apr. 7, 2006, 5 pp.

Elzabadani et al., "Self-Sensing Spaces: Smart Plugs for Smart Environments", http://www.icta.ufl.edu/projects/publications/2005-ICOST-Selfsensingspaces.pdf, received Apr. 7, 2006, 8 pp.

Symantec, "Symantec Discovery: Track hardware/software assets and monitor license compliance throughout a multiplatform IT infrastructure", http://eval.veritas.com/mktginfo/enterprise/fact_sheets/ent-factsheet_discovery_12-2005.en-us.pdf, Dec. 2005, 5 pp.

Leikas et al., "Virtual Space Computer Games with a Floor Sensor Control Human Centered Approach in the Design Process", http://www.dcs.gla.ac/uk/~stephen/workshops/haptic/papers/leikas.pdf, date unknown, 4 pp.

Tollmar et al. "Gesture + Play, Exploring Full-Body Navigation for Virtual Environments", http://people.csail.mit.edu/demirdji/papers/cvprhci-pg.pdf, date unknown, 8 pp.

(56) References Cited

OTHER PUBLICATIONS

Stockley et al., "Virtual Reality on a WIM: Interactive Worlds in Miniature", Conference on Human factors in Computer Systems, Proceedings of the SIGCHI Conference on Human Factors in Computing Systems, ACM Press/Addison-Wesley Publishing Co., http://delivery.acm.org/10.1145/230000/223938/p265-stoakley.html?key1=223938&key2=5808034411&coll=GUIDE&dl=GUIDE&CFID=73042672&CFTOKEN=344092262, 1995, 14 pp.

Turk, "Perceptual User Interfaces", http://ilab.cs.ucsb.edu/projects/turk/Turk&20DEC-NSF%20Workshop.pdt, date unknown, 10 pp.

Lee et al., "Modeling Virtual Object Behavior Within Virtual Environment", Virtual Reality Laboratory, Dept. of Computer Science and Engineering, pp. 41-48.

Nikitin et al., "Real-Time Simulation of Elastic Objects in Virtual Environments Using Finite Element Method and Precomputed Green's Functions", Eighth Eurographics Workshop on Virtual Environments, 2002, 6 pp.

TouchTable™, Northrop Grumman, www.northropgrumman.com, 2005, 2 pp.

TouchTable™, Northrop Grumman, http://www.ms.northropgrumman.com/touchtable.index.html, 2006, 2 pp.

U.S. Official Action mailed Mar. 3, 2008 in U.S. Appl. No. 11/278,264.

U.S. Official Action mailed May 30, 2008 in U.S. Appl. No. 11/425,843.

U.S. Official Action mailed Jul. 10, 2008 in U.S. Appl. No. 11/423,883.

U.S. Official Action mailed Oct. 7, 2008 in U.S. Appl. No. 11/350,853.

U.S. Official Action mailed Dec. 2, 2008 in U.S. Appl. No. 11/278,264.

U.S. Official Action mailed Jul. 9, 2009 in U.S. Appl. No. 11/426,101.

U.S. Official Action mailed Nov. 12, 2009 in U.S. Appl. No. 11/278,264.

U.S. Official Action mailed Dec. 15, 2009 in U.S. Appl. No. 11/426,101.

U.S. Official Action mailed Oct. 27, 2010 in U.S. Appl. No. 11/278,264.

U.S. Official Action mailed Nov. 22, 2010 in U.S. Appl. No. 11/426,101.

U.S. Official Action mailed Dec. 5, 2012 in U.S. Appl. No. 11/427,684.

U.S. Official Action mailed Apr. 20, 2011 in U.S. Appl. No. 11/427,684.

U.S. Official Action mailed May 12, 2010 in U.S. Appl. No. 11/278,264.

U.S. Official Action mailed Jun. 7, 2011 in U.S. Appl. No. 11/278,264.

U.S. Official Action mailed Oct. 6, 2010 in U.S. Appl. No. 11/427,684.

U.S. Official Action mailed Feb. 24, 2010 in U.S. Appl. No. 11/426,101.

U.S. Official Action mailed May 6, 2013 in U.S. Appl. No. 11/427,684.

U.S. Official Action mailed Jul. 2, 2010 in U.S. Appl. No. 11/426,101.

U.S. Official Action mailed Sep. 27, 2013 in U.S. Appl. No. 11/427,684.

U.S. Official Action mailed Apr. 14, 2009, in U.S. Appl. No. 11/278,264.

* cited by examiner

VARIABLE ORIENTATION USER INTERFACE

BACKGROUND

In today's digital world, the use of graphical user interfaces (GUIs) to display and manage computer information has become ubiquitous. For example, the WINDOWS™ (Microsoft Corporation, Redmond, Wash.) operating systems used in many personal computers employ a GUI desktop that displays information (e.g., text, images, etc.) for a user to view, and provides various icons or indicia with which the user may interact (e.g., a button, an Internet link, etc.). Software applications in these systems count on knowing, in advance, the position from which the user will be viewing the display screen, and will arrange and orient their graphical elements accordingly. For example, for a typical desktop computer, the applications assume that the user will be viewing the display with one particular edge being at the "top," and will orient text and images with that orientation in mind.

New applications opened on the system assume the same orientation for the display, and present their information aligned in the same manner as other applications (e.g., they share the same understanding of "up" and "down" as other applications on the system). This allows the same user to easily and accurately see the information for the various applications. However, such arrangements may include drawbacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A graphical user interface may be provided with a first graphical user interface in a first orientation, and in response to receiving a user request to open a second graphical user interface on the display, a second user interface can be displayed with a different, and variable, orientation. In some configurations, the orientation of the second interface can be automatically determined based on a touch input used to request the interface. For example, the touch could be a gesture, and the orientation could be based on the direction of movement in the gesture. The location of the second interface can also be based on the touch.

The interfaces can be a polygonal panel, such as a rectangle, or they may be a non-polygonal shape, such as an oval or circle. The interface can be a radial interface with elements that can be read by users viewing from different directions. A radial interface can be circular, and can be an arc centered at a corner of the display (e.g., the display screen or a display area). Elements on radial interfaces, such as buttons, labels, etc., may be oriented with respect to a central point at the corner (e.g., rotated such that they appear upright when viewed from the central point). Elements of an interface may be rearranged and moved around. For example, buttons on a circular interface may "slide" around the interface, where the buttons rotate to maintain an orientation with respect to the center origin point of the interface.

Different areas of the display may be assigned to predetermined orientations and/or types of interfaces. For example, corners of the display may default to radial interfaces at the corner. Other areas may be the edges of the display. The display may be divided into the various areas, for example, into quadrants.

The various interfaces may be independently rotated to have individual orientations, so that users may freely move about the perimeter of the display and still interact with their application interfaces. For example, some interfaces may remain at their orientations while other interfaces are rotated to change orientations. The actual rotation can be accomplished using a recursive method involving parent-child data structures, where the child data structures may identify location of interface elements using the interface itself as a frame of reference.

The addition of a new interface may cause existing interfaces to rotate and/or move to avoid overlapping the new interface.

These and other features will be described in greater detail below.

DETAILED DESCRIPTION

Figure 1:
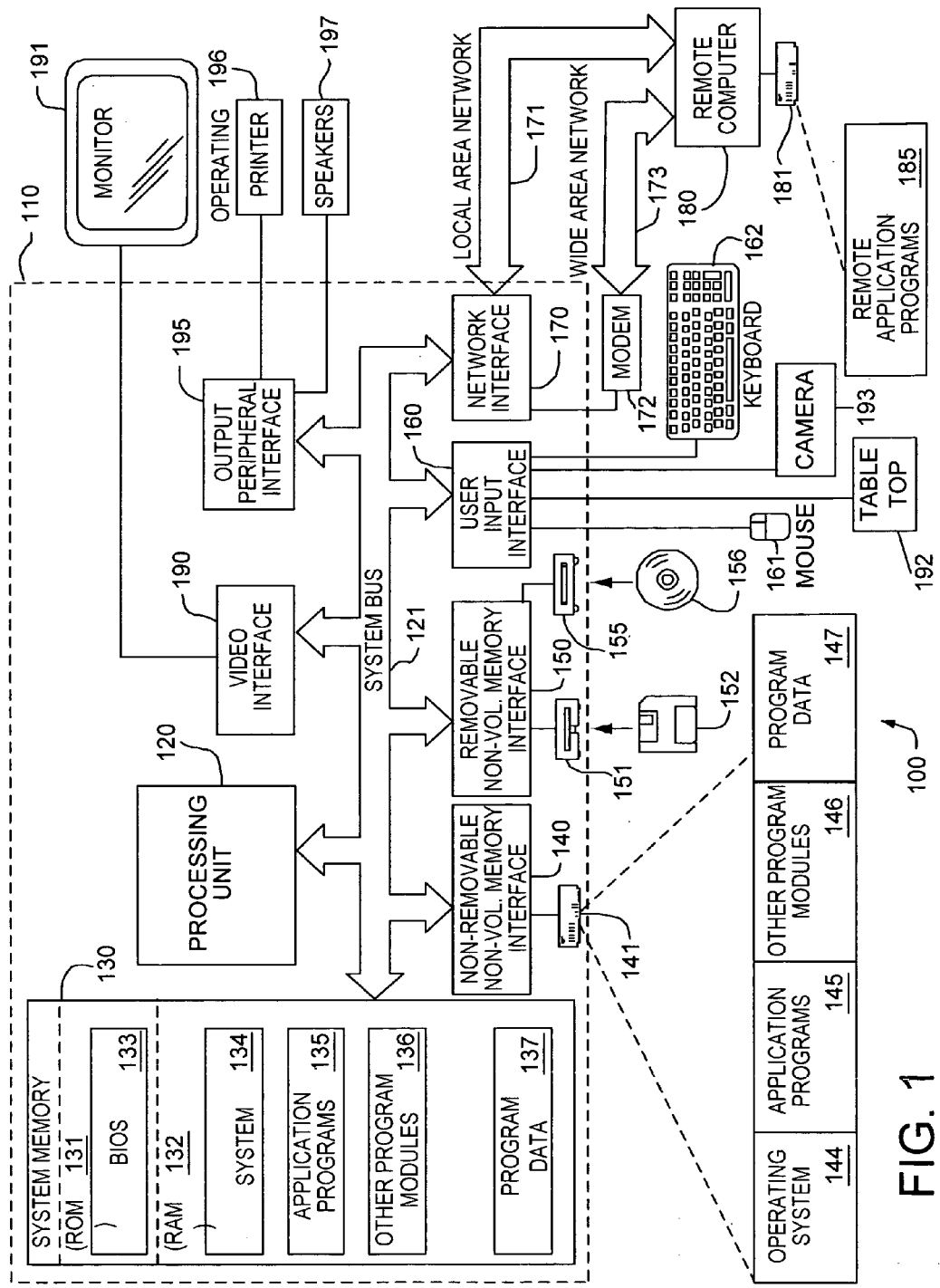
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that can perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. In an alternative arrangement, or in addition, a touch and/or proximity sensitive input system may be separate from monitor 191, and may include a planar surface such as a table top 192 and any applicable sensing systems to make the planar surface touch sensitive, such as camera 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
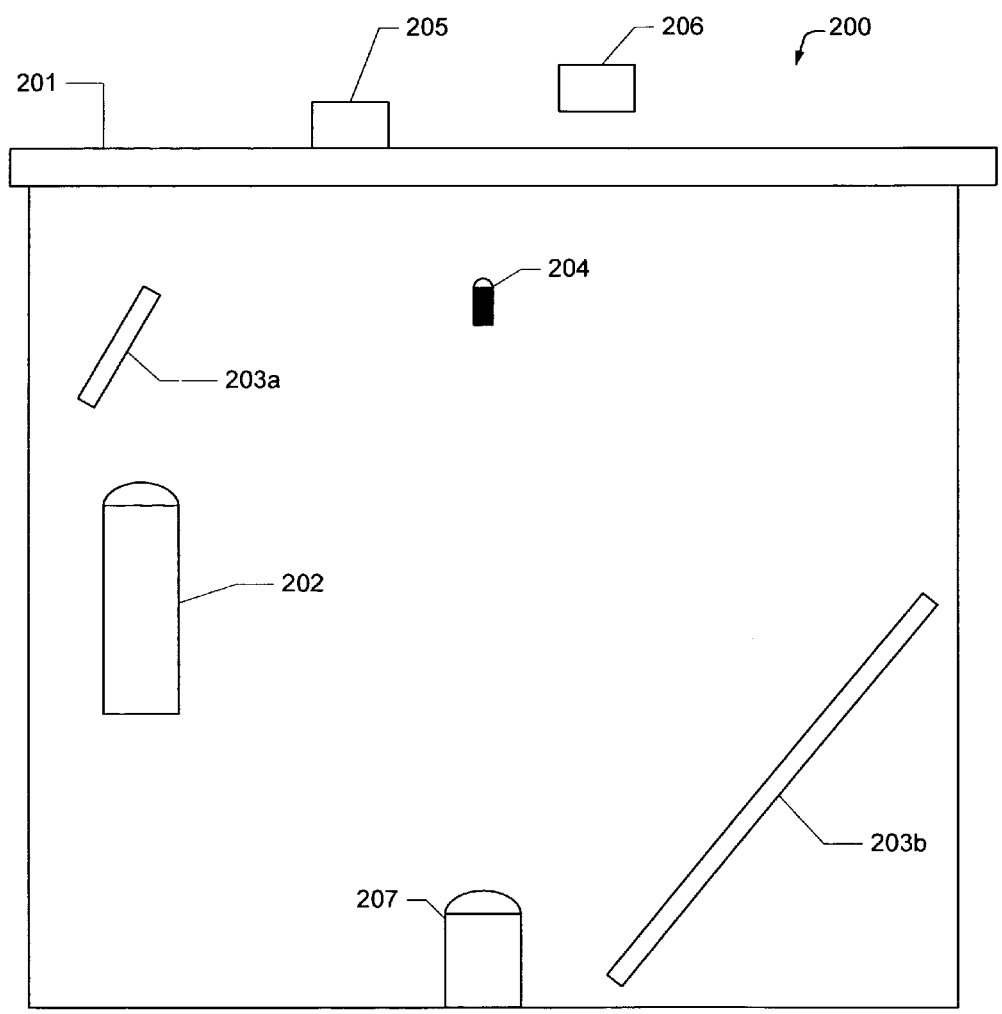
FIG. 2 illustrates an interactive table environment and interface.

The computing device shown in FIG. 1 may be incorporated into a system having table display device 200, as shown in FIG. 2. The display device 200 may include a display surface 201, which may be a planar surface such as a table top. As described hereinafter, the display surface 201 may also help to serve as a user interface.

The display device 200 may display a computer-generated image on its display surface 201, which allows the device 200 to be used as a display monitor for computing processes, displaying television or other visual images, video games, and the like. The display may be projection-based, and may use a digital light processing (DLP) technique, or it may be based on other display technologies, such as liquid crystal display (LCD) technology. A projector 202 may be used to project light onto the underside of the display surface 201. It may do so directly, or may do so using one or more mirrors. As shown in FIG. 2, the projector 202 projects light for a desired image onto a first reflective surface 203a, which may in turn reflect light onto a second reflective surface 203b, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device (s) 204 may reflect off of these objects, and may be detected by a camera 207, which may be an IR camera if IR light is used. The signals from the camera 207 may then be forwarded to a computing device (e.g., the device shown in FIG. 1) for processing, which, based on various configurations for various applications, may identify the object and its orientation (e.g. touching or hovering, tilted, partially touching, etc.) based on its shape and the amount/type of light reflected. To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection- and sensing techniques for the display of data and the reception of input, but other techniques may be used as well. For example, stylus-sensitive displays are currently available for use with Tablet-based laptop computers, and such displays may be used as device 200. Additionally, stylus- and touch-sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Figure 4:
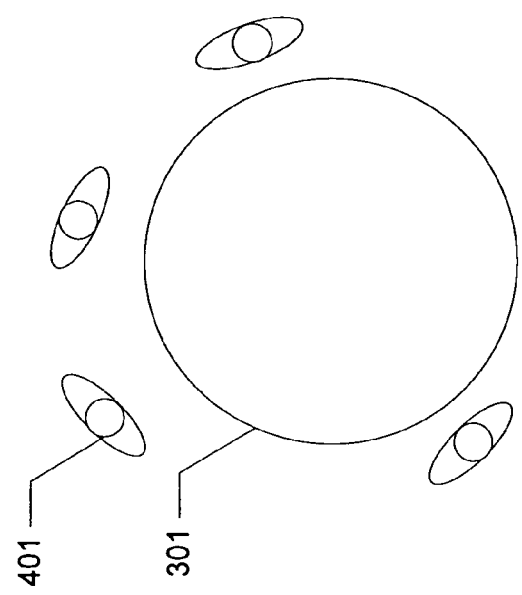
FIG. 4 illustrates a top view of the display from FIG. 3.
Figure 3:
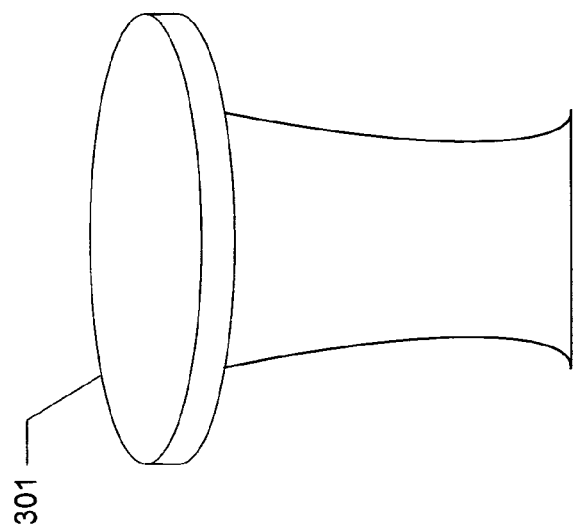
FIG. 3 illustrates an example of an interactive display.

FIG. 3 illustrates an illustrative configuration of an implementation of the system shown in FIG. 2, in which device 301 is used as a tabletop display device. FIG. 4 illustrates an overhead view of such a table, around which a number of users 401 may be seated or standing. Each user 401 may wish to interact with the display on the surface of table 301, for example to place and/or touch an object, or to play a party video game. If the various players 401 wish to participate in the same game, using the same display area of table 301, there might not be an "up" or "down" that is common among all players.

Figure 5:
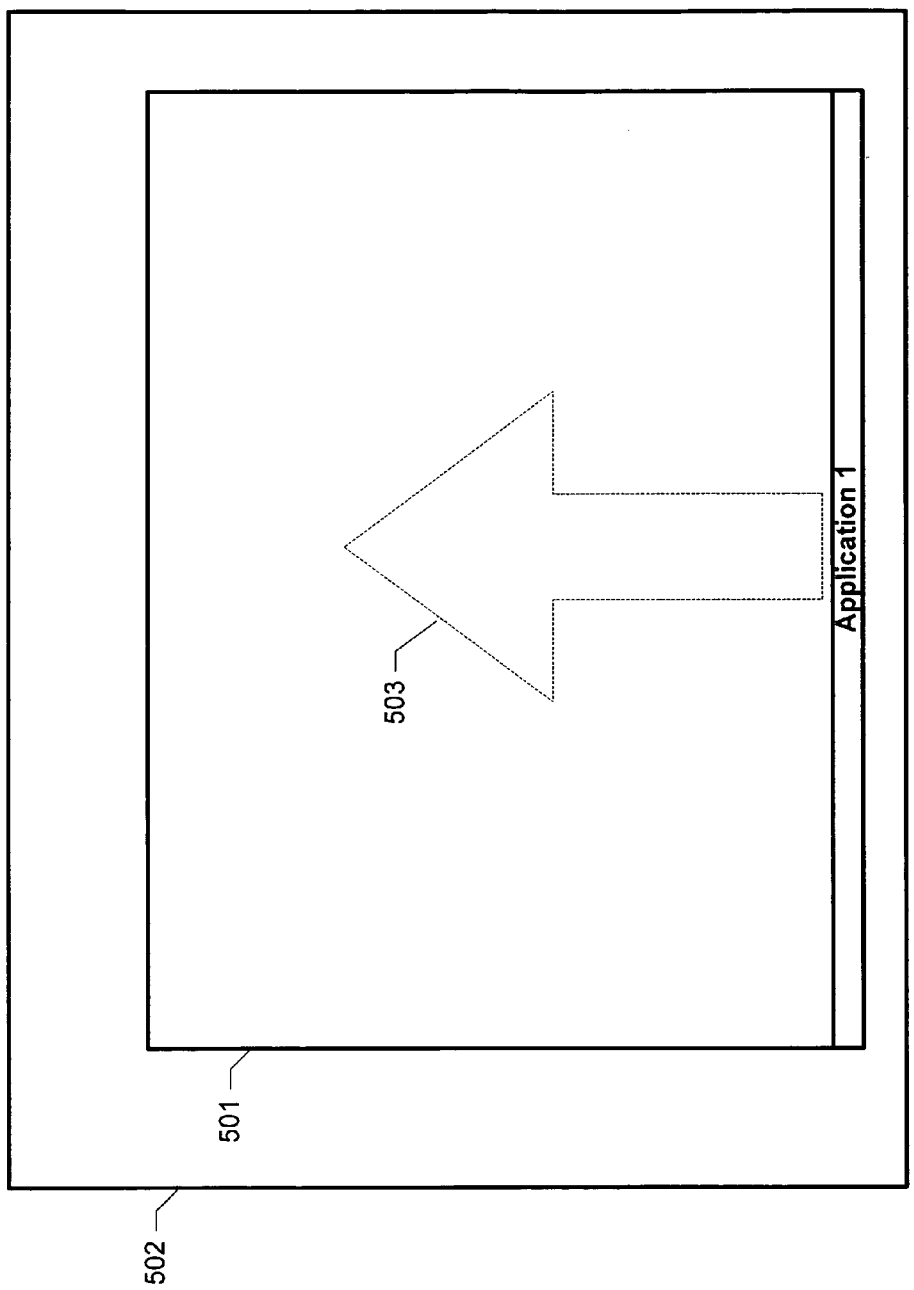
FIG. 5 illustrates an example display having a first application and its orientation.

FIG. 5 illustrates an example graphical user interface 501 used by an application on a computing system display 502, such as the display screen or surface of any of the table systems described above. The application's interface 501 may be a portion of the display screen 502, such as a graphical panel or window, or it may encompass the entire viewable area of a display screen, such as in a full-screen display mode. The application using interface 501 may be any type of software/hardware/firmware application, such as a hardware operating system, word processing file, email program, Internet browser, movie viewer, etc., and may be an application's primary interface with users, having multiple images and/or menus oriented for the user's view. The content within the first application's interface 501 may be oriented such that the arrow 503 points in the upward direction of the interface 501. Accordingly, the first application may generate text, images, etc. that is displayed vertically aligned with the orientation shown by arrow 503. Of course, arrow 503 is shown here for illustrative purposes to indicate the orientation of the interface 501, and there need not be an actual corresponding arrow displayed on the user's display screen.

Figure 6:
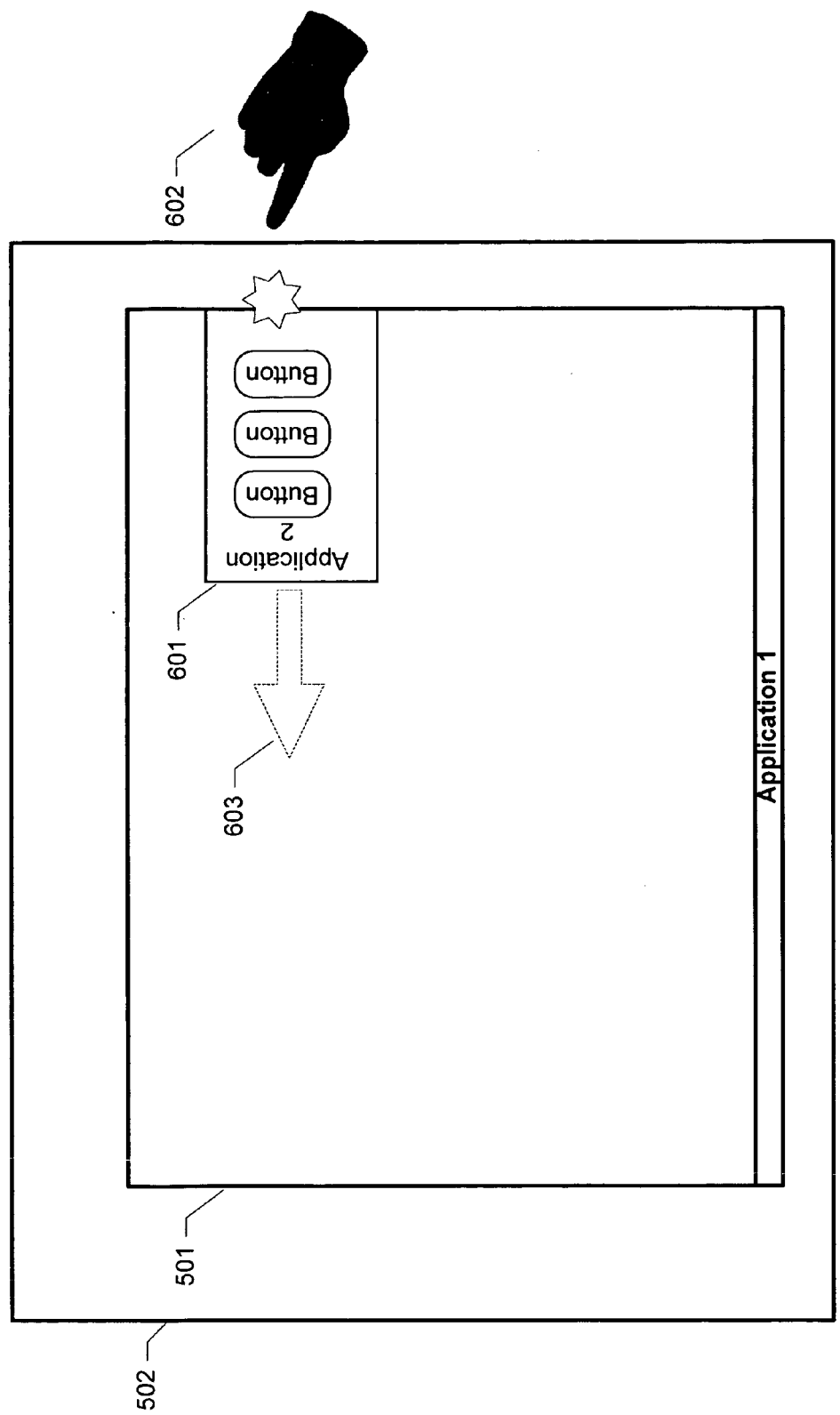
FIG. 6 illustrates an example in which a second application is opened on the FIG. 5 display.

FIG. 6 illustrates an example situation in which a second application interface 601 is opened on the display screen 502 while the first application interface 501 is in use. The interface 601 may be of any type, such as a graphical panel or window, a displayed menu, etc. The second interface 601 may be requested by a user 602, who may be a different user from the one who was using the first application's interface 501, and the two interfaces 501, 601 need not even be related to one another. So, for example, a first user might be using interface 501 to browse the Internet, and a second user may approach and open a second interface 601 for editing a word processing document. This second user 602 may have approached the display from a different side, such as the right side shown in FIG. 6, and may have requested the second interface 601 through an input command. Having the second interface displayed at a different orientation, suited for the second user, may be helpful in allowing multiple users to share the display from different viewing angles.

The actual input command used by the second user 602 can be of any desired type. For example, a gesture, such as touching a location on the display with the user 602's finger and dragging it in a direction, such as towards the second user, may identify the orientation to use for the second interface 601. The gesture may include taps, swipes, holding in one place, or any other movement of an object that may be detected by the display. Keyboard and/or mouse input devices may also be used to select a new orientation. Alternatively, the display surface itself 502 may be configured to determine a direction from which the user approached, the angle of the user's finger (or other object detected by the display), etc., to automatically determine the appropriate orientation for the second interface 601. The input may also include a button press, such as on a keyboard, a displayed graphical button on the display 502, mouse click, etc., or any other desired input command. In some situations, physical pieces may be placed on the display surface and recognized (e.g., by reading a pattern on the bottom of a piece, or by detecting a shape of the piece), and the location, placement, orientation and/or type of the piece may be interpreted as an input requesting a particular interface and its display characteristics.

The second interface 601 may appear at a location on the display 502 based on the location of the user input, or at a predetermined location, and may have an orientation that is also based on the user input. For example, the second interface 601 may be placed at the location of a user's swipe, and oriented in a direction of the swipe gesture (e.g., if user 602 swiped a finger from right to left, that directional swipe may determine the "up" orientation for interface 601). Orientation arrow 603 illustrates an example of such an orientation. Alternatively, the second interface 601 may have a predetermined orientation based on location. For example, second interface 601 is shown as being placed near the right edge of display 502, and the interface 601 may automatically be oriented such that it is perpendicular to the right edge, as shown. Such an automatic orientation may occur, for example, whenever the interface 601 is placed within a predetermined distance (e.g., an inch) of an edge of the display.

Figure 7:
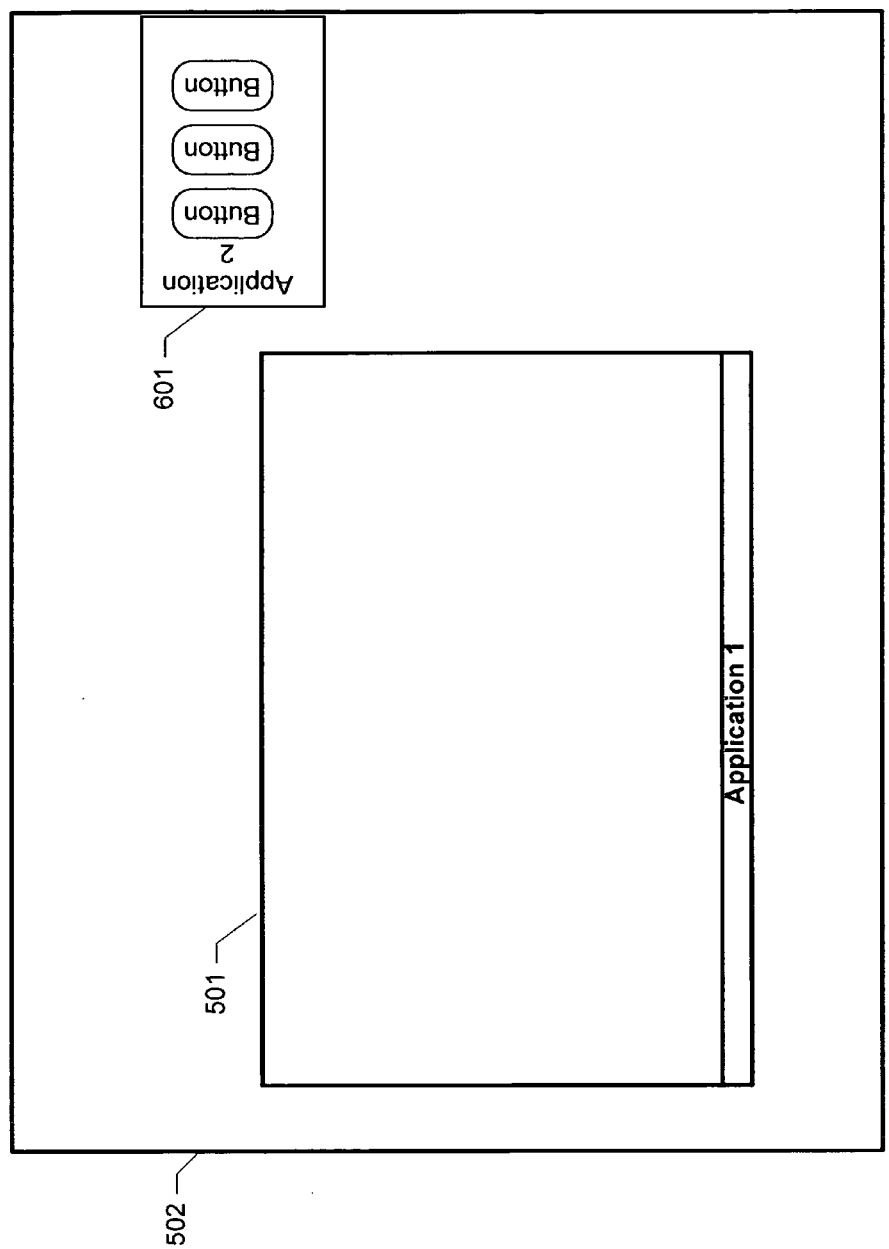
FIG. 7 illustrates another example in which a second application is opened on the FIG. 5 display.

FIG. 6 shows the second interface 601 overlapping the first interface 501. This may be desirable where, for example, second interface 601 and first interface 501 are both related, and/or both generated by the same application. Or, if first interface 501 is set to a full-screen mode, second interface 601 might result in an overlap. However, the second interface 601 need not overlap the first interface 501. FIG. 7 illustrates an alternative configuration in which interface 501 automatically resizes itself to avoid overlap when second interface 601 is created. The application interface 501 for Application 1 may be configured (either by default or through user selection of an option) to shrink in size to allow for a new interface 601, and may take the size and orientation of interface 601 into account when doing so.

Figure 8:
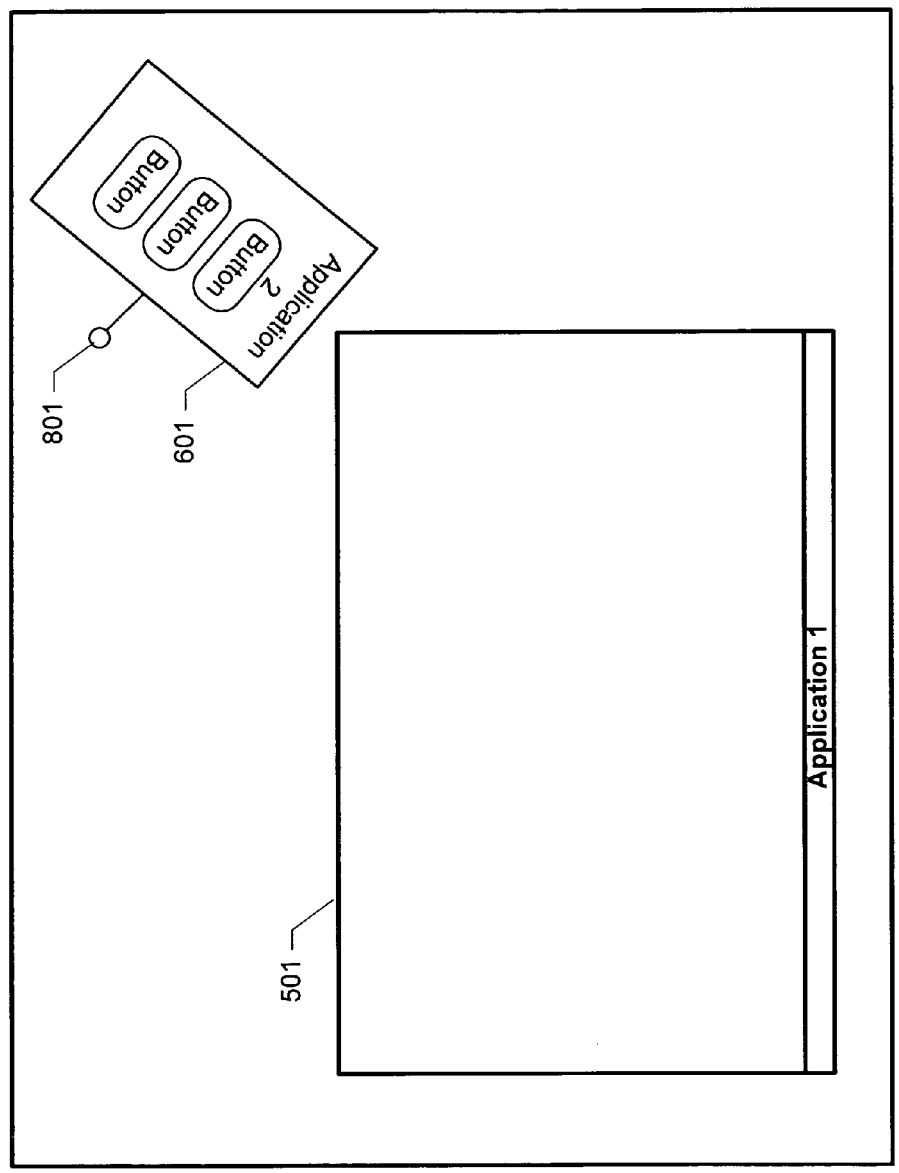
FIG. 8 illustrates an example in which the second application from FIG. 7 is rotated.

The orientation of various application interfaces may be changed by the user. FIG. 8 illustrates an example display 502 in which the second interface 601 has been rotated to change orientation. This may occur, for example, should the user 602 walk around the display 502 to use it from another angle, perhaps to make room for yet more people. The change in orientation of the interface 601 may be accomplished in any desired manner, and may include the use of a selectable graphical rotation handle 801. The user may select handle 801 in any desired manner, such as positioning a pointer over it and pressing a button, holding a finger over it, etc., and may then rotate the handle 801 about a central pivot point of the interface 601. The interface 601 may also be moved and/or dragged to a different location as part of, or in addition to, this change in orientation. Alternatively, the application may interpret certain inputs as intending not to interact with the application itself, but to move and reorient the application, without the need for explicit user interface elements to indicate such a reorientation. For example, pressing predetermined keys on a keyboard may cause a change in orientation to an orientation desired by the user as a preference. Additionally, the system may automatically monitor a user's position, and orient the user's application(s) accordingly. For example, the system may employ one or more cameras to track the user's position, and may record in memory an identification of which users launched which applications, in order to automatically reorient those applications when it detects that the user has changed locations.

Carrying out an orientation of the displayed interface 601 may be accomplished in a variety of ways. For example, for graphics display systems that support use of a transformation matrix, the displayed image of the interface 601 may automatically be rotated using such a matrix. Alternatively, a recursive approach may be used in which individual elements of an interface 601 are rotated. For example, an interface 601 may be viewed as a collection of individual objects, where some objects (child objects) are oriented and positioned based on an orientation and position of a parent object, such that repositioning/reorienting the parent object automatically causes the child objects to be repositioned/reoriented as well. Using the interface 601 as an example, the parent object might be a panel formed by the outermost border of the interface 601, while the individual buttons may be the child objects. As a further alternative, applications may have different layouts of objects for different orientations.

Figure 9A:
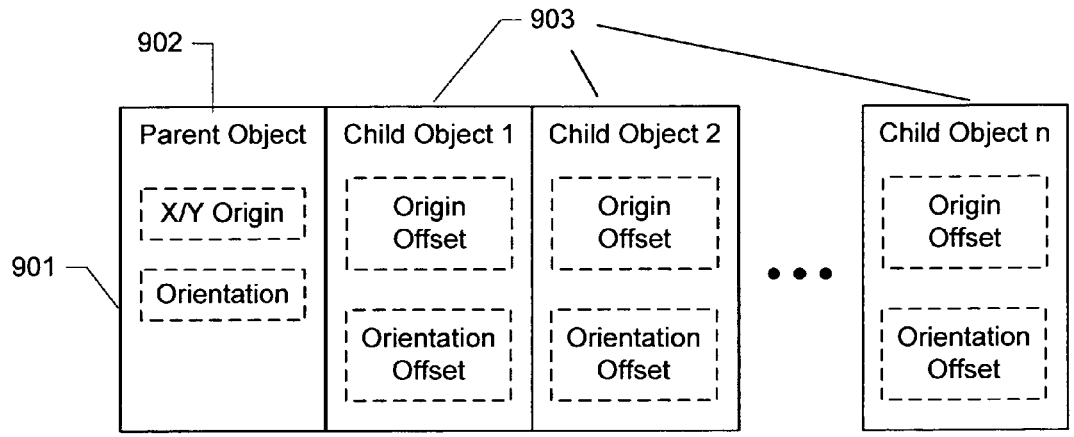
FIG. 9a illustrates an example data structure for an interface and its subcomponents.
Figure 9B:
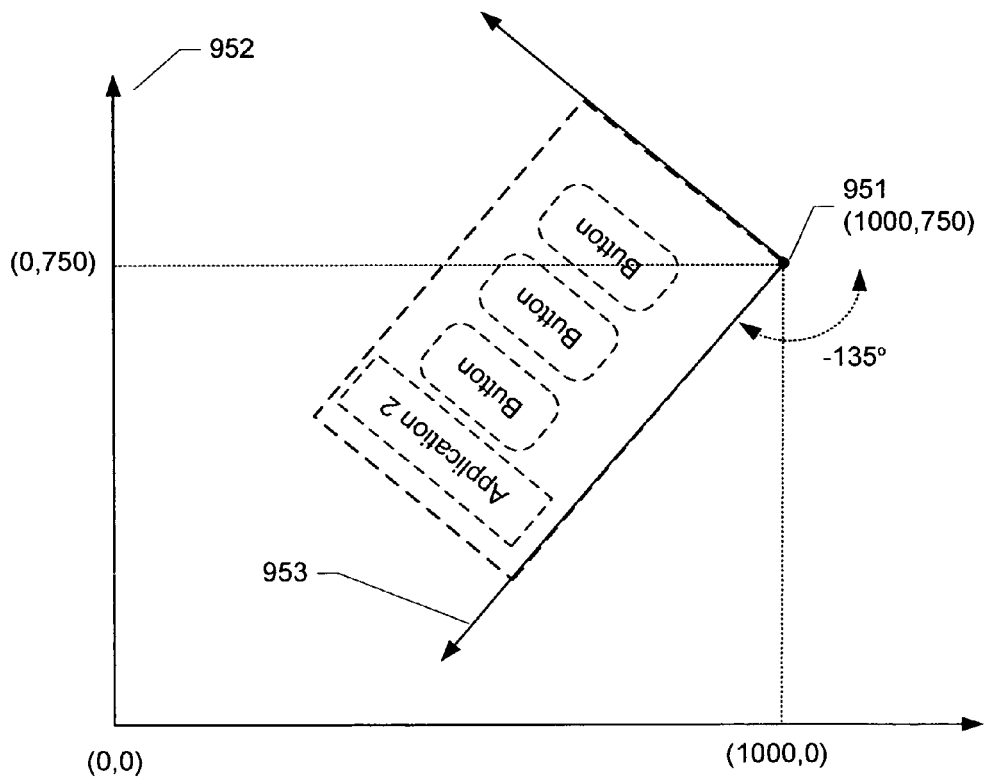
FIG. 9b illustrates an example set of frames of reference for the FIG. 9a data structure.

FIG. 9a illustrates an example data object 901 that can be used for identifying positional information for such an interface. As shown in FIG. 9a, a data object 901 for interface 601 may include a parent object 902. The parent data object 902 may identify a point used to place the interface 601, which may be an origin point of the interface 601. For example, FIG. 9b illustrates an example in which origin point 951 of interface 601 is the "lower-left" corner of the interface 601 (when it is viewed correct side up). The position of the origin point 951 on the screen may be defined using X-Y coordinates for an absolute frame of reference, such as a frame of reference used by the underlying hardware that generates the display screen. So, for example, that hardware might use an absolute X-Y coordinate system 953, and origin point 901 may be expressed as coordinates in this system, such as (1000,750), per the illustration in FIG. 9b.

The parent object 902 may also include orientation data, such as an angular value, second point, etc., that identifies the orientation for the interface 601. This angle may define the direction in which the Y axis, or "up," extends for the parent object. So, for example, the parent data object 901 for interface 601 shown in FIG. 9b may indicate an angle of 225°, or −135°, again using the absolute coordinate system as a frame of reference.

The data 903 for the child objects, however, may use a different frame of reference. Rather than using an absolute frame of reference, the child objects may have their position and orientation identified as an offset from the parent object. So, for example, the (0,0) position for the child object may refer to the origin point of the parent object, regardless of where it is located on the actual screen. Similarly, the X and Y axes 952 used for the child object may simply be aligned with the Y axis of the parent, regardless of whether the parent is vertical or rotated at some angle. By using such a dependency, changes in orientation and placement made to the parent may automatically be carried out to the children, and the children's data objects 903 need not be revised for every change (e.g., a child object, once created, need not be changed). So, if interface 601 is to be rotated, the system may rotate the parent object first, and then recursively apply the rotation to the child object using the new frame of reference.

The example interface 601 is depicted as originating along an edge of a display. Alternatively, the interface may be radial in nature, such that various elements on the interface have a point origin for their orientations. FIG. 10 illustrates an example of such a radial or point-origin interface 1001. The interface 1001 may have an origin at a corner of the display, and the various elements in the interface may be oriented such that the contents appear upright when viewed from the origin corner. Placing the origin at a corner of the display 502 (or application interface 501) may make it easier for two or more users to share the same interface 1001, as illustrated in FIG. 10b. The origin may include a GUI button 1002 that, when selected, causes the appearance of the radial interface 1001 for the second application. Such buttons 1003 may appear at one or more other corners of the display as well, as illustrated in FIG. 10c.

Figure 10A:
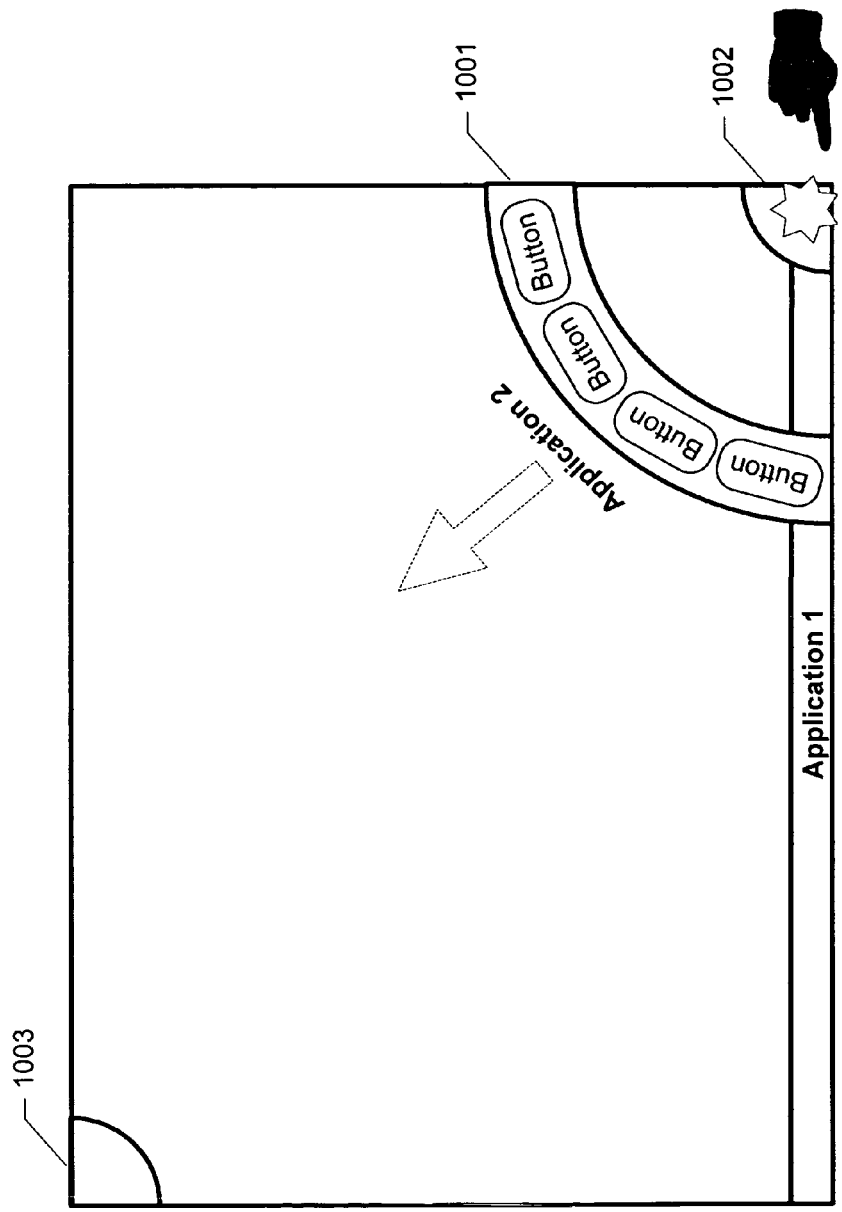
FIGS. 10a-c illustrate examples of a corner radial interface that may be opened on the display shown in FIG. 5 to allow multiple users to share an orientation on a display.
Figure 10B:
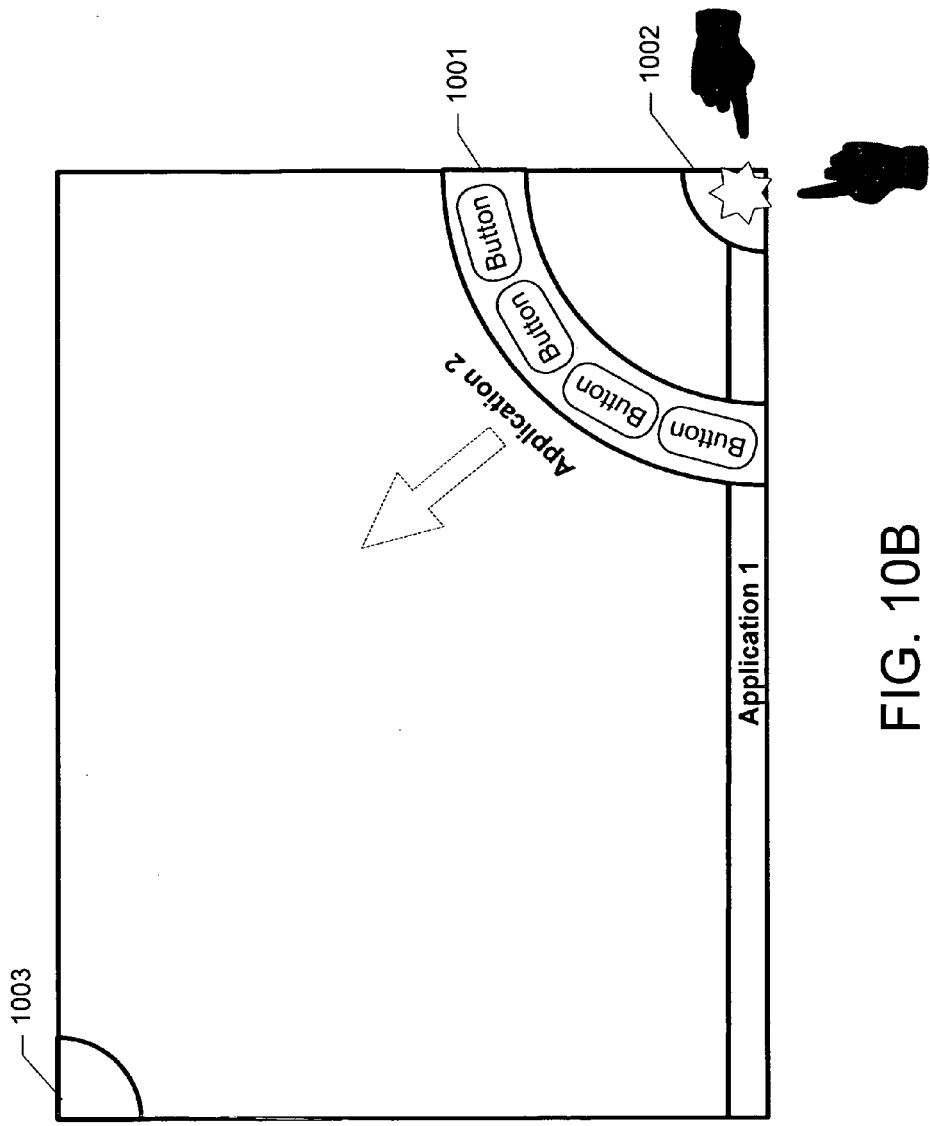
Figure 10C:
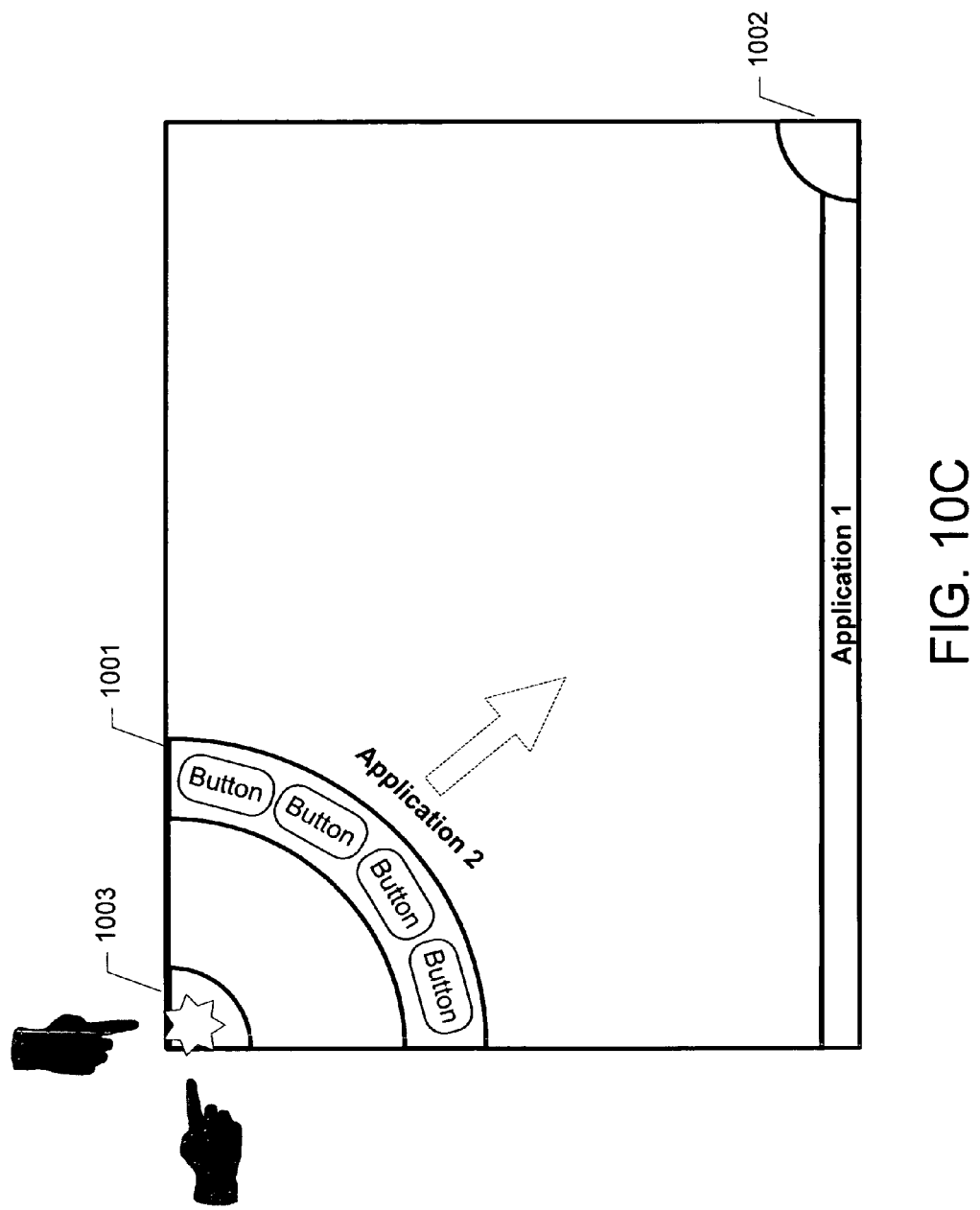
Figure 11A:
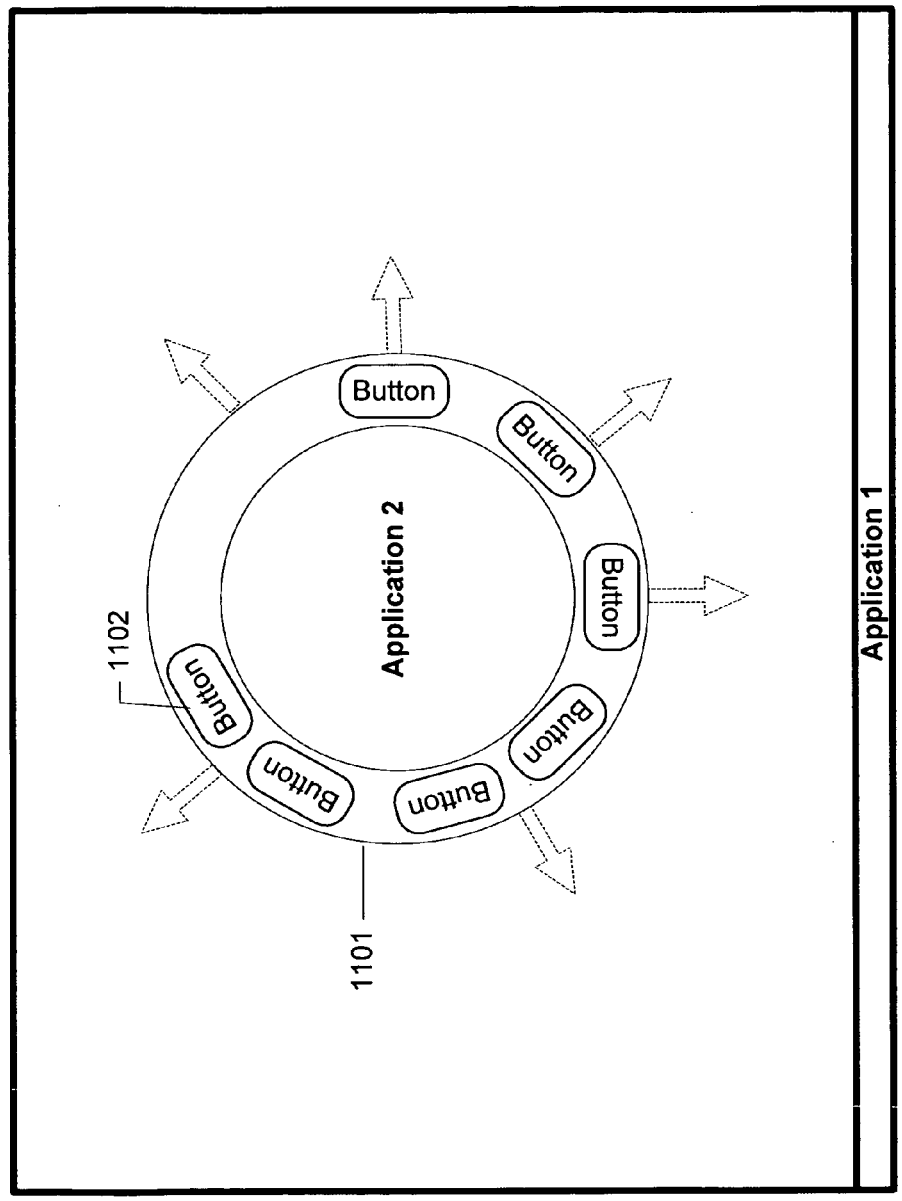
FIGS. 11a-b illustrate examples of a circular radial interface that may be opened on the display shown in FIG. 5 to allow multiple users to share an orientation on a display.

The radial application interface 1001 features shown in FIG. 10a-c may be placed at any corner of the display, for any type of display shape (e.g., square, rectangle, pentagon, hexagon, or other polygon). A radial interface need not, however, be limited to corners. For example, a radial interface may be placed in the body of a display, having a circular orientation with a center origin anywhere on the screen. FIG. 11a illustrates an example of a radial interface 1101 that is circular with a center origin. Having the center origin may mean that the various elements on the interface 1101, such as button 1102, are oriented such that they appear upright when viewed from the origin.

Although the example radial application interfaces are shown with a fixed-radius arc overall appearance, the interfaces need not have an arcuate overall appearance, and may be of any desired shape with its elements being oriented to have a point origin.

Figure 11B:
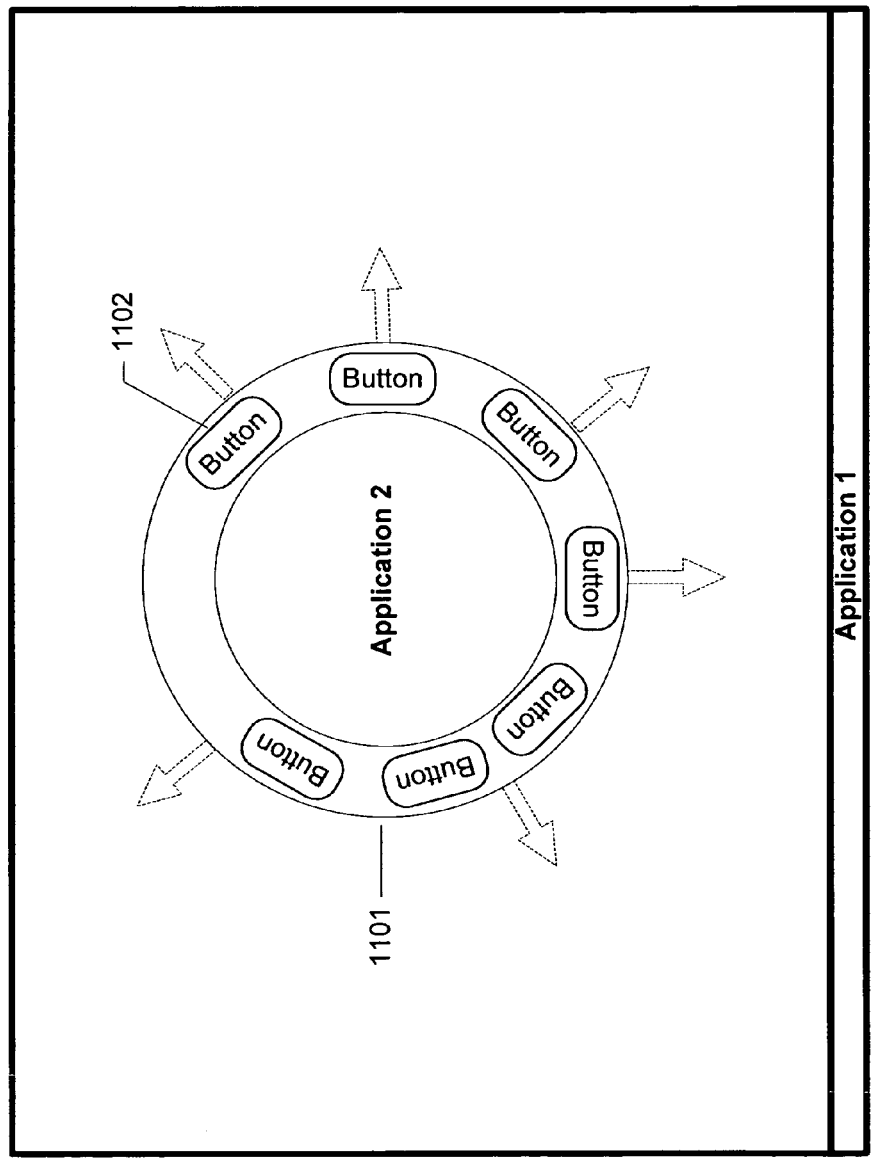

Having a circular radial interface 1101 may allow multiple users to share the interface 1101, conserving display screen real estate, but to allow for different viewing angles, the various elements on the interface, such as button 1102, may be repeated at one or more positions around the interface. So, for example, button 1102 may appear again at the bottom of the interface shown in FIG. 11a, to allow viewability from users viewing from the top edge of the FIG. 11a display. Alternatively, or in addition, button 1102 may be moveable around interface 1101. For example, as illustrated in FIG. 11b, button 1102 may be moved around a perimeter of interface 1101 to rest at a different position. This movement may be done in a variety of ways using any desired input or gesture, such as by keyboard input, mouse input, dragging, or swiping a button towards its desired new position, etc. With each new position, or during the movement itself, the button 1102 may automatically rotate to reorient itself so that it is still oriented with respect to the center origin of the interface 1101.

Figure 12:
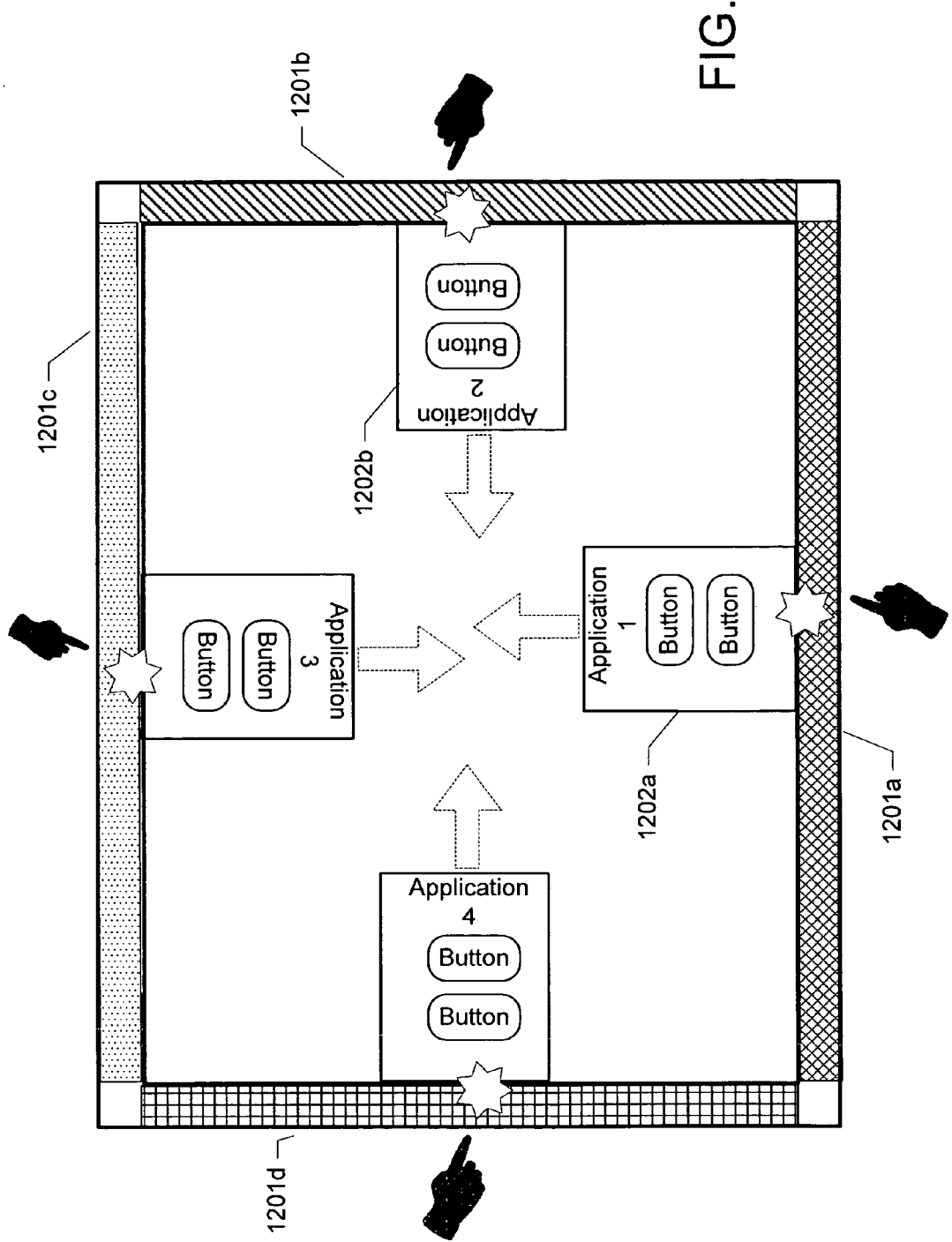
FIG. 12 illustrates an example of how orientation assignments may be made to areas of a display.

Application interfaces may have predetermined orientations depending on how they were originally requested. For example, as shown in FIG. 12, a number of edge regions 1201a-d may be defined along a periphery of the display 502. Edge regions 1201a-d may extend a predetermined distance (e.g., ½ an inch, an inch, etc.) in from an outer edge of the display 502, and user inputs occurring in such an edge region may automatically cause resulting application interfaces to be oriented so that their bottoms are pointed towards that edge. So, for example, if a user requests a first application by tapping an edge region 1201a, the resulting interface 1202a for that application may appear oriented as shown in FIG. 12—with the interface's bottom closest to the edge region 1201a. Similarly, a request by a second user at edge region 1201b may cause the resulting interface 1202b for the second application to be oriented as having its bottom closest to edge region 1201b.

Figure 13:
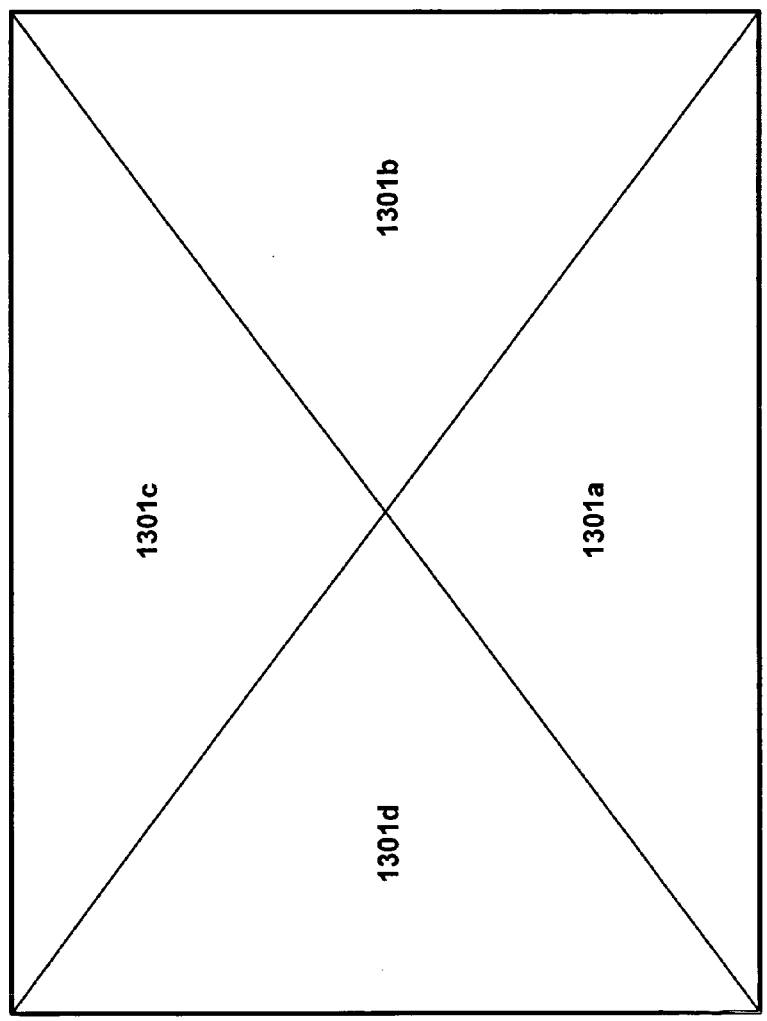
FIG. 13 illustrates another example of how orientation assignments may be made to areas of a display.

Modifications to the edge regions may also be made. For example, the edge regions may have different placement and/or appearances, and need not be limited to edges at all. FIG. 13 illustrates an alternative in which the display is divided into a number of regions, such as four quadrants 1301a-d. Each quadrant may be assigned to a predetermined orientation (e.g., quadrant 1301a may be assigned to an orientation in which the "bottom" is the lower edge of the display; while quadrant 1301d may be assigned to an orientation in which the "bottom" is the left edge of the display). User inputs made in one of these regions may cause a resulting application interface to be displayed with the region's predetermined orientation.

Figure 14:
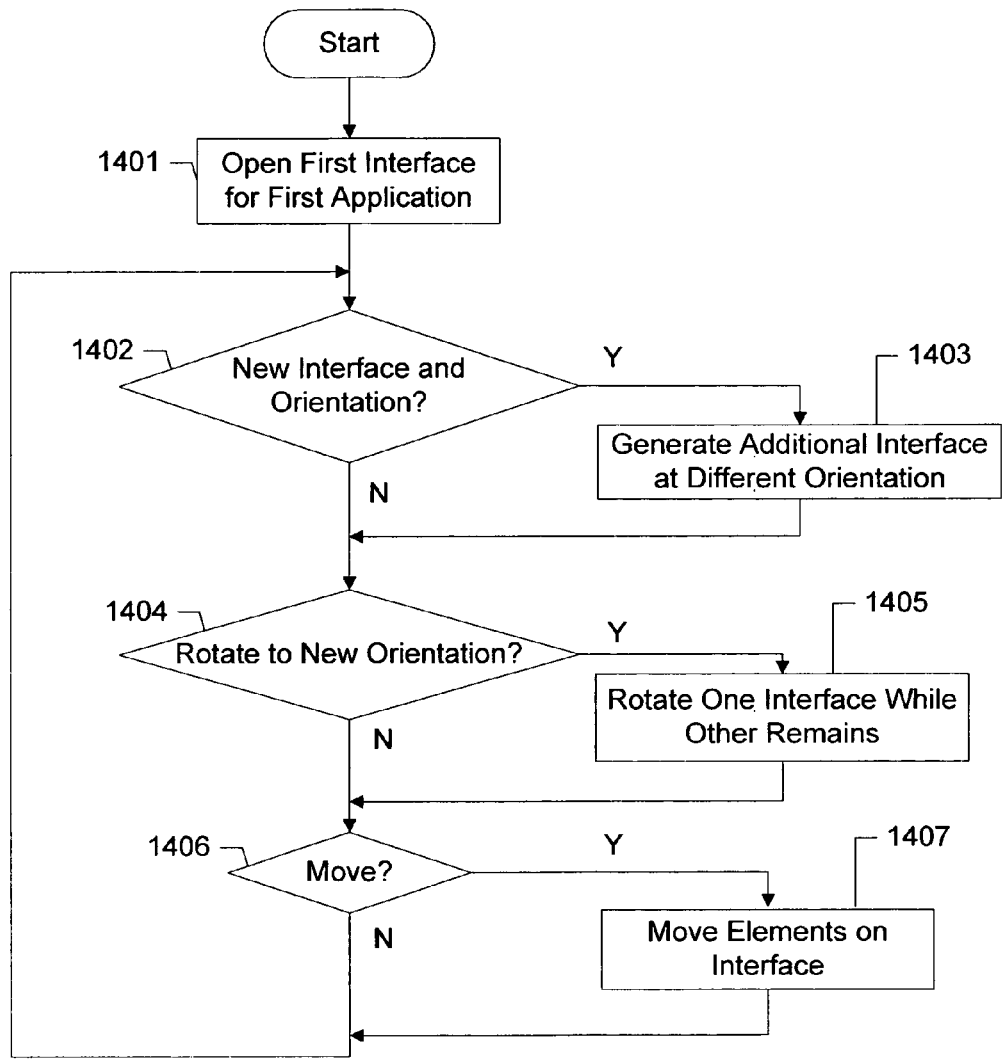
FIG. 14 illustrates an example process implementing various features described herein.

FIG. 14 illustrates an example process that may be used to implement one or more of the various features described herein. In step 1401, a first interface may be opened for a first application. This may be, for example, the interface 501 shown in Figures described above. That first interface may have a first orientation selected as described above. In step 1402, the system may receive a request to display a second interface at a new orientation. The second interface may be for the same application as the first (e.g., a pop-up window in the first application), a second instance of the same application, or may be for a different application, and may be entered using any of the methods described above, such as the tapping on an edge region in FIG. 12, or the entry of another gesture by the user. This request may originate from a second user, such as a new user who has approached the same table used by a first user, or it may simply be a request by a first user for an additional interface and/or application.

As noted above, the request may include an identification of a location for the new interface (such as by a user tapping on an origin location on the screen, or by selecting a region having a predetermined location, such as the corners shown in FIG. 10a-c), as well as a different orientation for the new interface (such as by a user tapping in a region having a predetermined orientation, or by other user input). The request may also identify the type of interface (e.g., corner radial, center-origin radial, edge-based, etc.) to be displayed.

In step 1403, the new interface may be generated and displayed if it was requested in step 1402, having the particular location and new orientation requested by the user (or as established by predetermined default). Adding the new interface to a display may result in an overlap on existing interfaces, or may cause existing interfaces to automatically move and/or change size to accommodate the new interface, as illustrated in FIG. 7.

If no request was received, then in step 1404 the process may check to determine whether an existing interface is to be rotated to a new orientation. Step 1405 illustrates the rotation of one interface to have a different orientation while a first interface remains at a current orientation, such as that shown in FIG. 8.

If no rotation request is received in step 1404, the system may check in step 1406 to determine whether the user (or other application) has requested movement of an existing interface. Step 1407 illustrates the movement of one or more interface elements, with corresponding change in orientation of the interface element, as shown in FIGS. 11a-b. Other changes may also be performed. For example, an interface 601 may be dragged to a corner, and may become a corner radial interface as shown in FIGS. 10a-c. This may be desired, for example, when a first user wishes to share an interface with a second user—the first user can simply drag the interface to a shared corner between the users. A corner interface 1001 may be dragged away from a corner, to a central area of the display, and may be automatically converted to a circular radial interface 1101 (or back to an interface 601, depending on user or system preference). The process may then return to step 1402 and repeat until the application interfaces are closed or the system is shut down.

Using one or more of the features and approaches described above, users' experiences with various orientations can be improved. Although the description above provides illustrative examples and sequences of actions, it should be understood that the various examples and sequences may be rearranged, divided, combined and subcombined as desired. For example, steps and features described may be omitted, or additional steps and features may be added. Accordingly, although the subject matter has been described in language specific to structural features and/or methodological acts, it is to be understood that the subject matter defined in the appended claims is not necessarily limited to the specific

We claim the following:

1. A computer-implemented method for implementing a graphical user interface, comprising the steps of:
   displaying a first application user-interface in a first orientation on a display of a device;
   receiving a user request to open a menu window of the first application while the first application is displaying, wherein the request indicates a second orientation that is different than the first orientation, wherein the request indicates the second orientation via a location of the request received on the display and an angle of the request with respect to the first orientation, wherein the menu window includes a parent object and a child object of the parent object, wherein the parent object is a panel of the menu window, wherein the panel is the outermost border of the menu window that includes an origin point field for receiving an origin coordinate of the panel of the menu window with respect to the display device and an angular field for receiving an angular orientation of the panel of the menu window with respect to the display device, wherein the child object is a control of the menu window that includes an origin offset value that indicates an offset of the origin of the control from the origin coordinate of the panel of the menu window, wherein the child object includes an angular offset value that indicates an angular offset of the control from the angular orientation of the panel of the menu window;
   receiving a user selection designating a menu window display preference comprising selectively permitting the menu window as overlapping the first application user-interface and preventing the menu window as overlapping the first application user-interface;
   in response to receiving the user request to open the menu window of the first application while the first application is displaying, recalculating the orientation of the menu window by:
      setting an origin value in the origin point field of the panel of the menu window based on the indicated location of the request with respect to the display,
      setting an angular value in the angular field of the panel of the menu window based on the indicated angle of the request with respect to the first orientation,
      maintaining the origin offset value of the control and content of the control with respect to the set origin value of the panel of the menu window,
      maintaining the angular offset value of the control and the content of the control with respect to the set angular value of the panel of the menu window, and
   displaying the menu window of the first application according to the second orientation while the first application user interface is maintained in the first orientation and according to the menu window display preference, wherein the menu window is movable within the entire display independent from any confines of the first application user interface.

2. The computer-implemented method of claim 1, wherein the user request is determined from a detection of a touch input within a dedicated display area of the display device.

3. The computer-implemented method of claim 1, wherein the menu window of the first application is a corner interface having child objects orientated radial from a first corner of the display device.

4. The computer-implemented method of claim 3, wherein an input gesture in the direction of a second corner of the display device automatically causes the menu window of the first application to move from the first corner to the second corner.

5. The computer-implemented method of claim 1, wherein the menu window is converted into a corner interface upon detecting the movement of the menu window to a corner of the display device.

6. A volatile or non-volatile computer storage medium having computer-executable instructions that, when executed by a processor, perform a method for implementing a graphical user interface, the method comprising:
   displaying a first application user-interface in a first orientation on a display of a device;
   receiving a user request to open a menu window of the first application while the first application is displaying, wherein the request indicates a second orientation that is different than the first orientation, wherein the request indicates the second orientation via a location of the request received on the display and an angle of the request with respect to the first orientation, wherein the menu window includes a parent object and a child object of the parent object, wherein the parent object is a panel of the menu window, wherein the panel is the outermost border of the menu window that includes an origin point field for receiving an origin coordinate of the panel of the menu window with respect to the display device and an angular field for receiving an angular orientation of the panel of the menu window with respect to the display device, wherein the child object is a control of the menu window that includes an origin offset value that indicates an offset of the origin of the control from the origin coordinate of the panel of the menu window, wherein the child object includes an angular offset value that indicates an angular offset of the control from the angular orientation of the panel of the menu window;
   receiving a user selection designating a menu window display preference comprising selectively permitting the menu window as overlapping the first application user-interface and preventing the menu window as overlapping the first application user-interface;
   in response to receiving the user request to open the menu window of the first application while the first application is displaying, recalculating the orientation of the menu window by:
      setting an origin value in the origin point field of the panel of the menu window based on the indicated location of the request with respect to the display,
      setting an angular value in the angular field of the panel of the menu window based on the indicated angle of the request with respect to the first orientation,
      maintaining the origin offset value of the control and content of the control with respect to the set origin value of the panel of the menu window,
      maintaining the angular offset value of the control and the content of the control with respect to the set angular value of the panel of the menu window, and
   displaying the menu window of the first application according to the second orientation while the first application user interface is maintained in the first orientation and according to the menu window display preference, wherein the menu window is movable within the entire display independent from any confines of the first application user interface.

7. The volatile or non-volatile computer storage medium of claim 6, wherein the user request is determined from a detection of a touch input within a dedicated display area of the display device.

8. The volatile or non-volatile computer storage medium of claim 6, wherein the menu window of the first application is a corner interface having child objects orientated radial from a first corner of a display device.

9. The volatile or non-volatile computer storage medium of claim 8, wherein an input gesture in the direction of a second corner of the display device automatically causes the menu window of the first application to move from the first corner to the second corner.

10. The volatile or non-volatile computer storage medium of claim 6, wherein the menu window is converted into a corner interface upon detecting the movement of the menu window to a corner of a display device.

11. A system for implementing a graphical user interface, the system comprising:
a processor; and
a memory having computer-executable instructions stored thereon, wherein the computer-executable instructions are configured for:
displaying a first application user-interface of a first application in a first orientation on a display device;
receiving a user request to open a second application-user interface of a second application while the first application is displaying, wherein the first application and the second application are different, wherein the request indicates a second orientation that is different than the first orientation, wherein the request indicates the second orientation via a location of the request received on the display and an angle of the request with respect to the first orientation, wherein the second application-user interface includes a parent object and a child object of the parent object, wherein the parent object includes an origin point field and an angular field, wherein the child object includes an origin offset value that indicates an offset from the origin value of the parent object, wherein the child object includes an angular offset value that indicates an offset from the angular value of the parent object;
receiving a user selection designating an interface display preference comprising selectively permitting the second application-user interface as overlapping the first application user-interface and preventing the second application-user interface as overlapping the first application user-interface;
in response to receiving the user request to open the second application-user interface while the first application is displaying, calculating the orientation of the second application-user interface by:
setting an origin value in the origin point field of the parent object based on the indicated location of the request,
setting an angular value in the angular field of the parent object based on the angle of the request with respect to the first orientation,
maintaining the origin offset value and the angular offset value of the child object and content of the child object, and
displaying the second application-user interface according to the second orientation while the first application user interface is maintained in the first orientation and according to the interface display preference, wherein the second application user interface is movable within the entire display independent from any confines of the first application user interface within the display.

12. The system of claim 11, wherein the user request is determined from a detection of a touch input within a dedicated display area of the display device.

13. The system of claim 11, wherein the second application user interface window is a corner interface having child objects orientated radial from a first corner of the display device.

14. The system of claim 13, wherein an input gesture in the direction of a second corner of the display device automatically causes the second application user interface to move from the first corner to the second corner.

15. The system of claim 11, wherein the second application user interface window is converted into a corner interface upon detecting the movement of the second application user interface window to a corner of the display device.

* * * * *